US008312340B2

(12) United States Patent
Itozawa et al.

(10) Patent No.: US 8,312,340 B2
(45) Date of Patent: Nov. 13, 2012

(54) INFORMATION PROCESSING DEVICE, DATA TRANSMITTING DEVICE, AND DATA TRANSFER METHOD OF DATA TRANSMITTING DEVICE

(75) Inventors: Shintaro Itozawa, Kawasaki (JP); Hiroshi Nakayama, Kawasaki (JP); Junji Ichimiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 159 days.

(21) Appl. No.: 12/926,690

(22) Filed: Dec. 3, 2010

(65) Prior Publication Data

US 2011/0083059 A1  Apr. 7, 2011

Related U.S. Application Data

(63) Continuation of application No. PCT/JP2008/060284, filed on Jun. 4, 2008.

(51) Int. Cl.
*H03M 13/00* (2006.01)
*H04L 1/18* (2006.01)

(52) U.S. Cl. ............... 714/751; 714/757; 714/774

(58) Field of Classification Search ............... 714/751, 714/757, 774
See application file for complete search history.

(56) References Cited

U.S. PATENT DOCUMENTS

| 5,671,237 A * | 9/1997 | Zook ............... 714/755 |
| 6,067,654 A * | 5/2000 | Nakano et al. ........ 714/757 |
| 6,189,123 B1 * | 2/2001 | Anders Nystrom et al. .. 714/751 |
| 6,308,294 B1 * | 10/2001 | Ghosh et al. ............ 714/751 |
| 6,697,988 B2 * | 2/2004 | Kim et al. .............. 714/752 |
| 2008/0063007 A1 * | 3/2008 | Christiaens et al. ......... 370/458 |
| 2008/0229168 A1 * | 9/2008 | Murakami et al. ........... 714/751 |
| 2009/0177938 A1 * | 7/2009 | Pons et al. ............... 714/751 |
| 2009/0183052 A1 * | 7/2009 | Kanno et al. ............. 714/763 |
| 2009/0245426 A1 * | 10/2009 | Ratnakar et al. ........... 375/327 |

FOREIGN PATENT DOCUMENTS

| JP | 63-50130 | 3/1988 |
| JP | 5-276145 | 10/1993 |
| JP | 2002-27025 | 1/2002 |
| JP | 2003-345677 | 12/2003 |
| JP | 2005-354310 | 12/2005 |
| JP | 2006-186527 | 7/2006 |

OTHER PUBLICATIONS

International Search Report for PCT/JP2008/060284, mailed Jul. 29, 2008.

* cited by examiner

*Primary Examiner* — Joseph D Torres
(74) *Attorney, Agent, or Firm* — Staas & Halsey LLP

(57) ABSTRACT

A selection-signal generating circuit in an LSI being a transmission-side LSI, when a transmission error is detected on an A-side signal line and degeneration control is performed thereon, instructs a selector to select an input from an ECC generator in order to transmit data and ECC data for this data to be transmitted via the B-side signal line, via the A-side signal line. In this manner, the degenerated signal line is used to transmit the ECC data for transmission data to be transmitted via a signal line which is not degenerated.

8 Claims, 9 Drawing Sheets

INFORMATION PROCESSING DEVICE, DATA TRANSMITTING DEVICE, AND DATA TRANSFER METHOD OF DATA TRANSMITTING DEVICE

CROSS-REFERENCE TO RELATED APPLICATION

This application is a continuation of International Application No. PCT/JP2008/060284, filed on Jun. 4, 2008, the entire contents of which are incorporated herein by reference.

FIELD

The embodiments discussed herein are directed to an information processing apparatus, a data transmitting device, and a data transfer method of the data transmitting device.

BACKGROUND

Conventionally, there is generally adopted parallel communication, in communication between integrated circuits such as LSIs (Large Scale Integrations) and between modules, in which bits of data with N-bit width are transmitted from a transmission side to a reception side via N-signal lines provided in parallel with each other.

In the parallel communication, degeneration control of transmission channels is often performed in such a manner that the N-signal lines are divided into several segments and all the signal lines included in a segment that contains even a single signal line on which a communication error occurs caused by noise or jitter are made unusable. With the degeneration control, the possibility of occurrence of a subsequent communication failure can be avoided, which allows reliability of communication to be enhanced.

For example, a transmission-side interface divides transmission data into words (1 word=32 bits), adds ECC (Error Check Code) data to each word, uses transmission channels corresponding to the words, and transmits the data to a reception-side interface. In this case, there is known a conventional technology for performing the degeneration control in which when transmission anomaly is detected by performing check on the data using the ECC data in the reception-side interface, a corresponding transmission channel is made unusable.

For the data transmitting/receiving devices, in communication between LSIs or modules, a transmission-side data transmitting device divides transmission data into divided data, generates ECC data for the respective divided data, serially transmits the divided data to the reception side, and, thereafter, collectively transmits the ECC data to a reception-side data transmitting device. As for the reception-side data transmitting device, there is known a conventional technology in which it performs check on corresponding divided data previously received and performs error correction on the received divided data based on the received respective ECC data.

A data transfer system, in communication between LSIs, is configured that an LSI as a data transfer source transfers transmission data to an LSI as a data transfer destination. The LSI as the data transfer destination, if there is an error in received data, requires retransmission of the data of the LSI as the data transfer source. As for the LSI as the data transfer source, there is known a conventional technology in which it performs verification/correction on the transmission data and then transmits the transmission data to the LSI as the data transfer destination.

However, of the conventional technologies, the data transmission system performing the degeneration control for making unusable a transmission channel where transmission anomaly is detected has a problem of inefficient use of the signal lines such that when the transmission anomaly is detected in a transmission channel on a word basis, even if only a signal line of one bit is actually anomalous, all the signal lines for one word are made unusable, which causes large reduction of a transmission rate of the data from the transmission-side interface to the reception-side interface, and any actually usable signal line of the signal lines made unusable is made inactive.

Moreover, originally, of the conventional technologies, the technology for not disconnecting a signal line on which transmission anomaly occurs has a problem in which even if a physical failure occurs on the signal line, error correction of ECC and retransmission of transmission data should be performed as long as the signal line is continuously used, which causes necessity of wasteful processes.

Patent document 1: Japanese Laid-open Patent Publication No. 2006-186527
Patent document 2: Japanese Laid-open Patent Publication No. 2005-354310
Patent document 3: Japanese Laid-open Patent Publication No. 2003-345677

SUMMARY

According to an aspect of an embodiment of the invention, an information processing apparatus includes a data transmitting device that transmits data with N-bit width (N: positive integer); a data receiving device that receives the data with N-bit width; and a system monitoring device connected to the data transmitting device and the data receiving device. The data transmitting device includes a first data-with-parity generating circuit that generates first data with parity in which a parity is added to first data with X-bit width (X: positive integer satisfying N>X) of the data with N-bit width; a second data-with-parity generating circuit that generates second data with parity in which a parity is added to second data with (N−X)-bit width of the data with N-bit width; a first ECC generating circuit that generates first ECC data for the first data; a second ECC generating circuit that generates second ECC data for the second data; a selection-signal generating circuit that generates and outputs a first selection signal and a second selection signal based on a first or a second error notification signal for the first or the second data with parity received from the data receiving device; a first selecting circuit that selects and outputs either one of the first data with parity and the second ECC data based on the first selection signal; a second selecting circuit that selects and outputs either one of the first ECC data and the second data with parity based on the second selection signal; and a data processing unit that degenerates the data with N-bit width to either the first data or the data with (N-X)-bit width based on a data-width degeneration notification signal received from the system monitoring device, and outputs degenerated data. The data receiving device includes a first parity checking circuit that detects a parity error for the first data with parity and outputs the first error notification signal when an error occurs; a second parity checking circuit that detects a parity error for the second data with parity and outputs the second error notification signal when an error occurs; a first ECC correcting circuit that detects and corrects an ECC error for the first ECC data; and a second ECC correcting circuit that detects and corrects an ECC error for the second ECC data.

DESCRIPTION OF EMBODIMENTS

Preferred embodiments of the present invention will be explained with reference to accompanying drawings. It should be noted that one example of the embodiment explained hereinafter indicates a case in which a data transmitting device and a data receiving device are LSIs provided in the information processing apparatus.

However, the example is not limited to the case, and thus, any data transmitting device and the data receiving device may be used if they are devices for transmitting and receiving data with N-bit data width in parallel.

Figure 1:
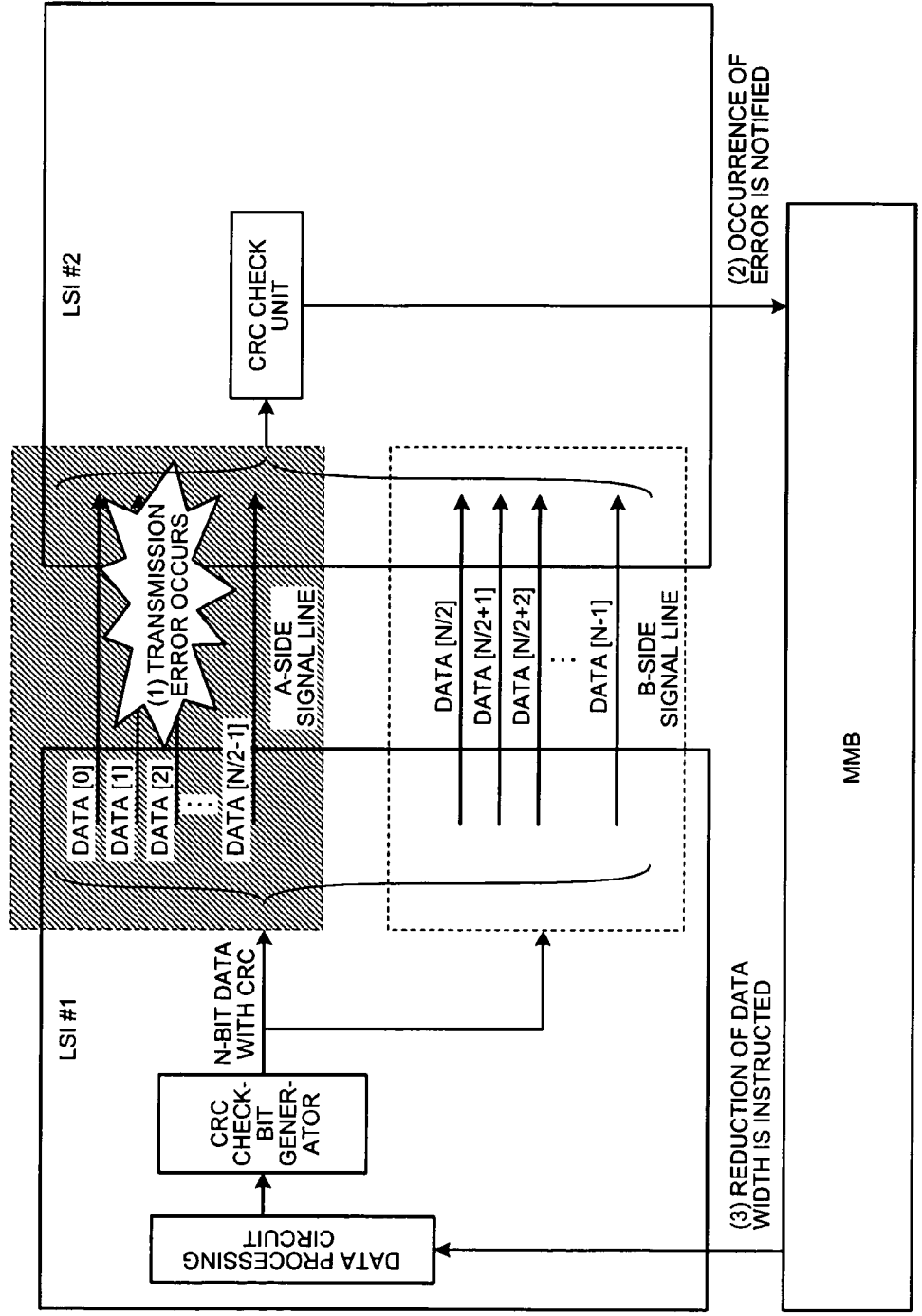
FIG. 1 is a diagram representing a situation of degeneration control of transmission channels performed when a transmission error occurs in a conventional information processing apparatus.

Before detailed explanation of the example of the embodiment is made, the problem points of the conventional information processing apparatus, data transmitting device, and data transfer method of the data transmitting device will be explained. FIG. 1 is a diagram representing a situation of degeneration control of transmission channels performed when a transmission error occurs in the conventional information processing apparatus.

In the information processing apparatus illustrated in FIG. 1, an LSI #1 and an LSI #2 managed by MMB (ManageMent Board) for managing the whole of the apparatus are connected to each other via signal lines with N-bit bus width, and data with N-bit data width is transmitted from the LSI #1 to the LSI #2.

It should be noted that both the LSI #1 and the LSI #2 can transmit and receive data, however, to simplify explanation, the LSI #1 is set as a transmission-side LSI and the LSI #2 is set as a reception-side LSI.

Here, of N-bit signal lines, high-order N/2-bit signal lines (a combination of signal lines for transmitting data [0], . . . , data [N/2−1]) are called an A-side signal line. Furthermore, of the N-bit signal lines, low-order N/2-bit signal lines (a combination of signal lines for transmitting data [N/2], . . . , data [N−1]) are called a B-side signal line. In addition, the combination of the signal lines is called a segment.

A CRC (Cyclic Redundancy Check) check bit generator of the LSI #1 generates a CRC check bit for each data transmitted via each signal line and adds it to the data. Then, data with N-bit data width is transmitted from the LSI #1 to the LSI #2 via the A-side signal line and the B-side signal line.

When the LSI #2 receives the data with N-bit data width transmitted from the LSI #1, a CRC check unit in the LSI #2 performs data check on each data transmitted via the respective signal lines based on the CRC check bit added to the each data.

The reason that the ECC with which error detection and error correction are possible is not added to each data transmitted via each signal line but the CRC check bit is added thereto is because the CRC check bit has a small amount of data and thus less affects traffic.

In this manner, in the interface between LSIs of which high-speed communication is required, it is general to pursue the high speed of communication by limiting the process only to error detection of a transmission error without error correction performed thereon.

(1) It is assumed that a transmission error not due to a physical failure such as a disconnection of a signal line but due to noise or jitter is detected on any signal line of the A-side signal line through the data check. (2) At this time, the CRC check unit in the LSI #2 notifies occurrence of the transmission error on the A-side signal line to the MMB.

(3) Then, the MMB notified that the transmission error occurs on the A-side signal line instructs a data processing circuit in the LSI #1 to reduce its data width. More specifically, the MMB instructs the data processing circuit to reduce the data width in such a manner that the data width of the B-side signal line is reduced to N/2 bits. (4) Then the MMB controls all the signal lines of the A-side signal line on which the transmission error occurs so as to be made unusable.

The data processing circuit reduces the data width according to the instruction from the MMB. Then, the CRC check-bit generator generates a CRC check bit for each data to be transmitted via the B-side signal line and adds the CRC check bit to the data. The data with N/2-bit data width is transmitted from the LSI #1 to the LSI #2 via only the B-side signal line.

However, of entire data width, when all the data signal lines in a segment where a transmission error occurs are made unusable and the data width is reduced to continue data transmission, then the transmission rate of the data decreases less than that before the data width is reduced. If a similar error occurs during data transmission on any of the data signal lines in the segment where the transmission error occurs, then the data width is further reduced, which results in further reduction of the transmission rate of data between the LSIs.

More specifically, if such control that all the data signal lines of a segment where an transmission error occurs are made unusable is performed each time the transmission error occurs, the data width is continuously reduced, and thus the transmission rate of data between the LSIs goes on decreasing.

One example of the present embodiment has been made to solve the problem point, and an object thereof is to provide the information processing apparatus, the data transmitting device, and the data transfer method of the data transmitting device capable of ensuring error resistance against occurrence of the transmission error without reduction of the data width at a certain stage and thereafter, and therefore not reducing the transmission rate of the data between the LSIs.

Figure 2:
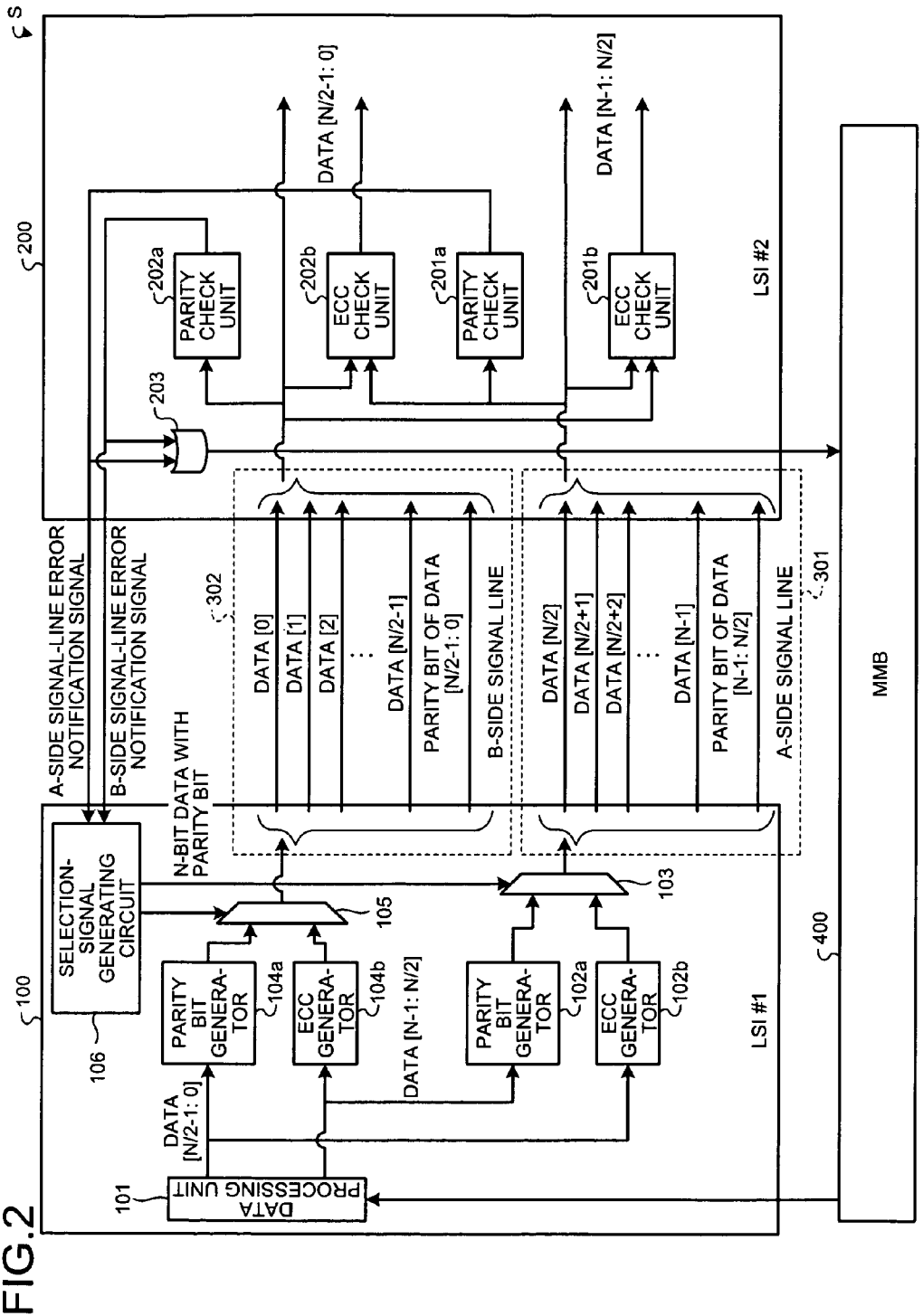
FIG. 2 is a block diagram representing a configuration of an information processing apparatus according to one example of an embodiment.

Next, a configuration of the information processing apparatus according to the one example of the embodiment will be explained below. FIG. 2 is a block diagram representing the configuration of the information processing apparatus according to the one example of the embodiment. The information processing apparatus according to the one example of the embodiment is assumed that a parity bit is further added to data to which CRC check data has been added and the data is transmitted from the transmission side to the reception side. However, the way of transmission is not limited thereto, and thus a parity bit may be added to data without the CRC check data and the data with the parity bit added thereto may be transmitted.

As illustrated in this figure, an information processing apparatus S according to the one example of the embodiment includes an LSI #1_100 on a data transmission side and an LSI #2_200 on a data reception side which are connected to each other via an A-side signal line 301 and a B-side signal line 302, both of which are data transmission channels between the LSI #1_100 and the LSI #2_200, and of which bus width is N/2+1 (N: positive integer). It should be noted that each of the A-side signal line 301 and the B-side signal line 302 is a segment of the signal lines.

An MMB 400 that controls and manages the information processing apparatus S is connected to the LSI #1_100 and the LSI #2_200. The MMB 400 receives an A-side signal-line error signal or a B-side signal-line error signal from the LSI #2_200, and instructs the LSI #1_100 to reduce the data width.

The LSI #1_100 includes a data processing unit 101, a parity bit generator 102a, an ECC generator 102b, a selector 103, a parity bit generator 104a, an ECC generator 104b, and a selector 105.

The parity bit generator 102a generates a parity bit and adds it to data with CRC to be transmitted to the LSI #2_200 via the A-side signal line 301. The ECC generator 102b generates ECC data for data with CRC to be transmitted to the LSI #2_200 via the B-side signal line 302. The ECC data is transmitted to the LSI #2_200 via the A-side signal line 301.

The selector 103 outputs either one of the data with the parity bit input from the parity bit generator 102a and the ECC data, input from the ECC generator 102b, for the data to be transmitted to the LSI #2_200 via the B-side signal line 302, to the A-side signal line 301 based on an instruction from a selection-signal generating circuit 106.

More specifically, the selection-signal generating circuit 106, when a transmission error is detected on the A-side signal line 301 and degeneration control is performed thereon, instructs the selector 103 so as to select an input from the ECC generator 102b in order to transmit the data to be transmitted via the B-side signal line 302 and the ECC data for the data, via the A-side signal line 301.

Likewise, the parity bit generator 104a generates a parity bit and adds it to data to be transmitted to the LSI #2_200 via the B-side signal line 302. The ECC generator 104b generates ECC data for data to be transmitted to the LSI #2_200 via the A-side signal line 301. The ECC data is transmitted to the LSI #2_200 via the B-side signal line 302.

The selector 105 outputs either one of the data with the parity bit input from the parity bit generator 104a and the ECC data, input from the ECC generator 104b, for the data to be transmitted to the LSI #2_200 via the A-side signal line 301, to the B-side signal line 302 based on an instruction from the selection-signal generating circuit 106.

More specifically, the selection-signal generating circuit 106, when a transmission error is detected on the B-side signal line 302 and degeneration control is performed thereon, instructs the selector 105 so as to select an input from the ECC generator 104b in order to transmit the data to be transmitted via the A-side signal line 301 and the ECC data for the data, via the B-side signal line 302.

The A-side signal line 301 has N/2 signal lines for transmitting data [N/2] to data [N−1] and one signal line for transmitting a parity bit of data [N−1:N/2]. These data of N/2+1 are transmitted in parallel from the LSI #1_100 to the LSI #2_200 via the A-side signal line 301.

When the A-side signal line 301 is degenerated and is made unusable, respective ECC data for data [0] to data [N/2−1] of the B-side signal line 302 are transmitted in parallel from the LSI #1_100 to the LSI #2_200 via signal lines of data [N/2] to data [N−1].

Likewise, the B-side signal line 302 has N/2 signal lines for transmitting data [0] to data [N/2−1] and one signal line for transmitting a parity bit of data [N/2−1:0]. These data of N/2+1 are transmitted in parallel from the LSI #1_100 to the LSI #2_200 via the B-side signal line 302.

More specifically, the interface between the LSI #1_100 and the LSI #2_200 has N+2 signal lines in total in order to transmit data with N-bit data width.

The LSI #2_200 includes a parity check unit 201a for performing parity check on the data received via the A-side signal line 301 based on the simultaneously received parity bit, and an ECC check unit 201b for performing ECC error detection and correction on the data received via the A-side signal line 301 and via the B-side signal line 302.

Likewise, the LSI #2_200 includes a parity check unit 202a for performing parity check on the data received via the B-side signal line 302 based on the simultaneously received parity bit, and an ECC check unit 202b for performing ECC error detection and correction on the data received via the A-side signal line 301 and via the B-side signal line 302.

When the parity error is detected in the respective received data by the parity check unit 201a or by the parity check unit 202a, the result of error detection is notified to the selection-signal generating circuit 106 in the LSI #1_100. For the notification, specific signal lines are provided between the LSI #1_100 and the LSI #2_200.

In this manner, the parity check unit 201a and the parity check unit 202a, when detecting the parity error in the respective received data, notify the detection of the parity error to the selection-signal generating circuit 106 in the LSI #1_100 being the transmission-side LSI. Therefore, the LSI #1_100 can recognize occurrence of the transmission error on either one of signal-line segments.

Then, the LSI #1_100 makes unusable the signal-line segment where the transmission error occurs, and performs degeneration control for changing the data width of the transmission data. Furthermore, the LSI #1_100 uses the degenerated signal-line segment to transmit ECC data for transmission data to be transmitted via a signal-line segment which is not degenerated, to the LSI #2_200 being the reception-side LSI. Therefore, it is possible to ensure reliability of the data transmission and prevent a vicious circle in which a signal-line segment is further degenerated.

The result of error detection is input to an OR gate 203 that calculates a logical sum of inputs. The OR gate 203 outputs a notification indicating detection of the transmission error by the parity check on either the A-side signal line 301 or the B-side signal line 302 to the MMB 400. The segment of the signal line where the transmission error is detected is notified so as to be identifiable at the time of notification.

In normal operation where no transmission error occurs on both of the signal-line segments (the A-side signal line 301 and the B-side signal line 302), the data [N/2−1:0] and the data [N−1:N/2] to be transmitted from the LSI #1_100 to the LSI #2_200 are directly transferred to the subsequent circuit.

Figure 3:
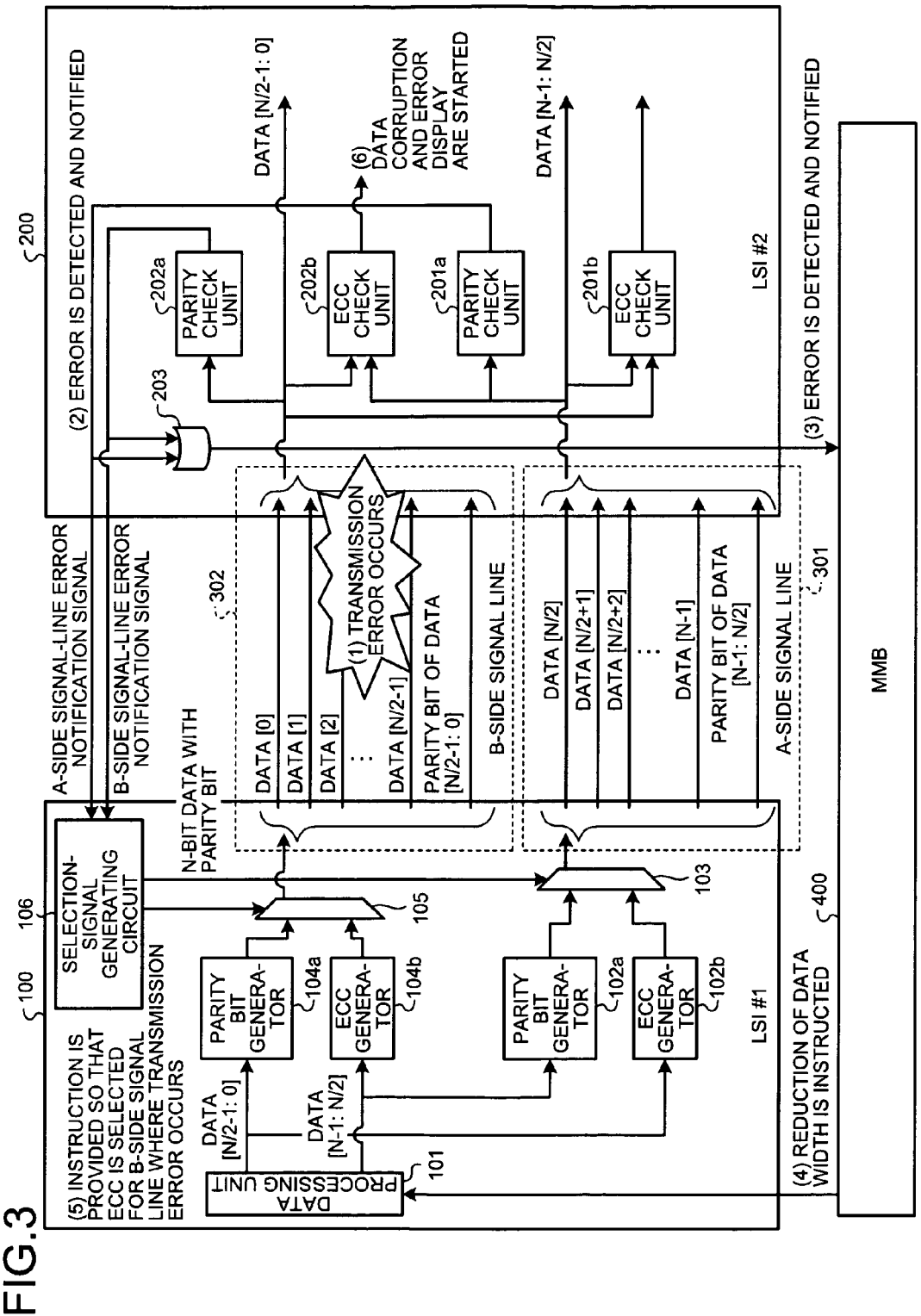
FIG. 3 is a diagram representing a situation of degeneration control of a transmission channel performed when a transmission error occurs in the information processing apparatus according to the one example of the embodiment.

However, as illustrated in, for example, FIG. 3 representing a situation of degeneration control of a transmission channel performed when the transmission error occurs in the information processing apparatus according to the one example of the embodiment, (1) it is assumed that the transmission error occurs on the B-side signal line 302. (2) At this time, the parity check unit 202a notifies the occurrence of the transmission error on the B-side signal line 302 to the selection-signal generating circuit 106 in the LSI #1_100, and also inputs the notification to the OR gate 203.

(3) Then, the OR gate 203 notifies the occurrence of the transmission error on the B-side signal line 302 to the MMB 400. (4) The MMB 400 notified of the occurrence instructs the data processing unit 101 in the LSI #1_100 to reduce the data width.

(5) The selection-signal generating circuit 106 having received the notification indicating the occurrence of the transmission error on the B-side signal line 302 instructs the selector 105 to select an input of the ECC generator 104b and to output the input to the B-side signal line 302.

Thus, the B-side signal line 302 where the transmission error occurs stops the use for data transmission, but instead transmits respective ECC data for data [N/2:N/2] with N/2-bit data width and for a 1-bit parity bit to be transmitted via the A-side signal line 301.

Accordingly, the transmission rate of the transmission data from the LSI #1_100 to the LSI #2_200 is reduced to ½, but error detection and error correction of the transmission data can be preformed by the simultaneously transmitted ECC data. Therefore, the reliability of the transmission data is improved and the transmission channel is prevented thereafter from being further degenerated.

Figure 4:
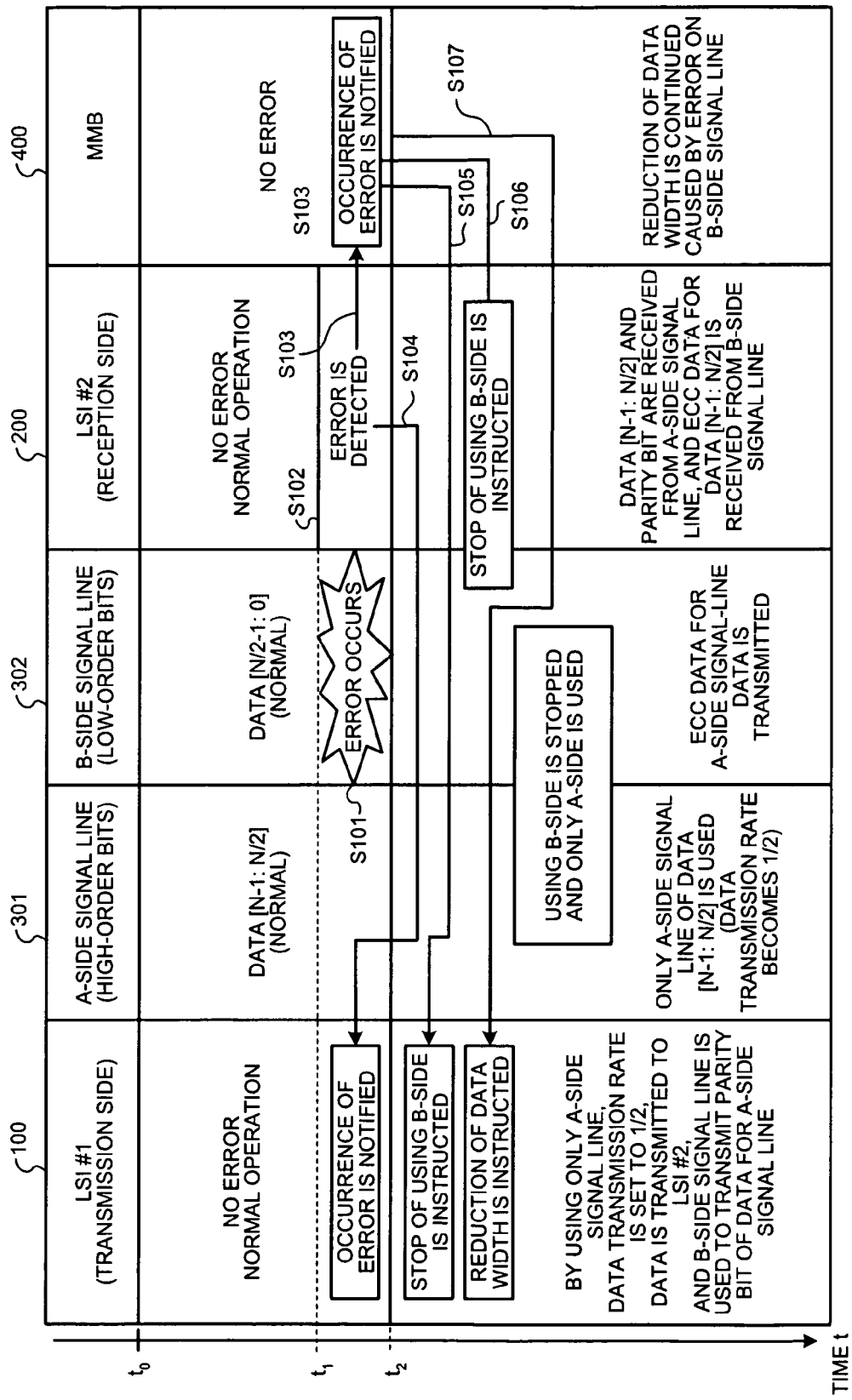
FIG. 4 is a time chart of the degeneration control of a transmission channel performed when a transmission error occurs in the information processing apparatus according to the one example of the embodiment.

Next, the situation, illustrated in FIG. 3, of the degeneration control of a transmission channel performed when a transmission error occurs in the information processing apparatus according to the one example of the embodiment will be explained using a time chart. FIG. 4 is a time chart of the degeneration control of the transmission channel performed when a transmission error occurs in the information processing apparatus according to the one example of the embodiment.

As illustrated in this figure, in time $t_0$ to $t_1$, a transmission error is not detected in the LSI #1_100 and the LSI #2_200. Thus, from the LSI #1_100 to the LSI #2_200, the data [N−1:N/2] is transmitted via the A-side signal line 301 and the data [N/2−1:0] is transmitted via the B-side signal line 302 as normal.

Here, in time $t_1$ to $t_2$, it is assumed that a transmission error occurs on the B-side signal line 302 (Step S101). Then the transmission error is detected in the LSI #2_200 (Step S102), and is immediately notified to the MMB 400 by the LSI #2_200 (Step S103). Thereafter, the LSI #2_200 also notifies the same transmission error to the LSI #1_100 (Step S104).

Subsequently, the MMB 400 issues a degeneration instruction of the transmission channel to the LSI #1_100 to stop the use of the B-side signal line 302 and transmit transmission data using only the A-side signal line 301 (Step S105).

The MMB 400 also issues the degeneration instruction of the transmission channel to the LSI #2_200 to stop the use of the B-side signal line 302 and transmit transmission data using only the A-side signal line 301 (Step S106).

With the degeneration instruction, the data transmission rate between the LSI #1_100 and the LSI #2_200 is reduced by (number of degenerated signal lines/number of all the signal lines)×100%. More specifically, because only the A-side signal line 301 corresponding to the data [N−1:N/2] is used, the data transmission rate becomes ½. The B-side signal line 302 transmits ECC data for the data to be transmitted via the A-side signal line 301.

Subsequently, the MMB 400 instructs the LSI #1_100 to reduce the data width (Step S107). Through this process, the LSI #1_100 reduces the data transmission rate to ½ and transmits the data to the LSI #2_200 by using only the A-side signal line thereafter.

Then, the LSI #2_200 receives the data [N−1:N/2] and the parity bit from the A-side signal line 301, and receives the ECC data for the data [N−1:N/2] from the B-side signal line. The MMB 400 causes the LSI #1_100 to continue reduction of the data width after the occurrence of the transmission error on the B-side signal line 302.

Figure 5:
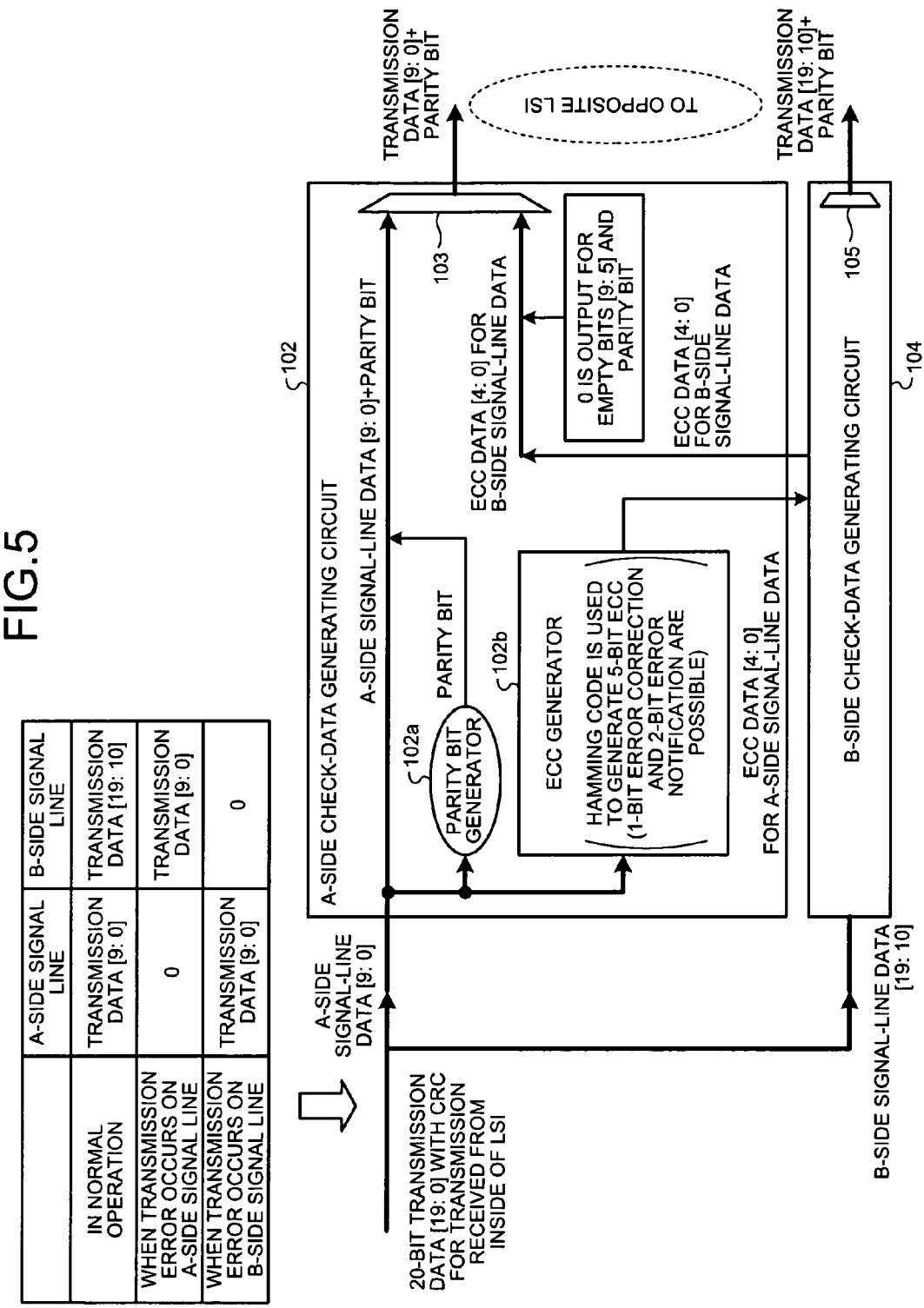
FIG. 5 is a diagram for explaining a detailed configuration of a transmission-side LSI and an overview of a check-data generation method of the information processing apparatus according to the one example of the embodiment.

Next, a detailed configuration of the transmission-side LSI and an overview of a check-data generation method of the information processing apparatus according to the one example of the embodiment will be explained below. FIG. 5 is a diagram for explaining the detailed configuration of the transmission-side LSI and the overview of the check-data generation method of the information processing apparatus according to the one example of the embodiment.

As illustrated in this figure, the parity bit generator 102a of an A-side check-data generating circuit 102 generates 1-bit parity and adds it to high-order 10-bit A-side signal-line data [9:0] of 20-bit data [19:0] with CRC for transmission received from the data processing unit 101 (see FIG. 3), and inputs the data to the selector 103.

In addition, the ECC generator 102b of the A-side check-data generating circuit 102 generates ECC data, using a Hamming code, for the high-order 10-bit A-side signal-line data [9:0] of the 20-bit data [19:0] with CRC for transmission received from the data processing unit 101 (see FIG. 3), and inputs the data to a B-side check-data generating circuit 104.

The ECC generator 102b uses the Hamming code to generate 5-bit ECC data which allows 1-bit error correction and 2-bit error notification.

Moreover, the A-side check-data generating circuit 102 inputs the ECC data [4:0], which is received from the B-side check-data generating circuit 104 where it is generated by using the Hamming code for low-order 10-bit B-side signal-line data [19:10] of the 20-bit data [19:0] with CRC for transmission received from the data processing unit 101 (see FIG. 3), to the selector 103. All of empty bits [9:5] other than the ECC data [4:0] and a parity bit are padded with 0's.

Then, the selector 103 selects "A-side signal-line data [9:0]+parity bit" or "ECC data [4:0] for B-side signal-line data" according to an instruction from the selection-signal generating circuit 106, and outputs the selected data.

It should be noted that if the A-side signal line 301 is made unusable, target data is changed to the B-side signal-line data [9:0] and corresponding ECC data [4:0] is similar to the case where the B-side signal line 302 is made unusable, except for the high-order 5 bits of the received data [19:10].

Normally, the transmission-side LSI transmits A-side signal-line transmission data [9:0] to the reception-side LSI via the A-side signal line 301, and transmits B-side signal-line transmission data [19:10] thereto via the B-side signal line 302.

When the transmission error occurs on the A-side signal line, the transmission-side LSI transmits bit data [9:0] with CRC for transmission whose data width is changed by the data processing unit 101 (see FIG. 3) to the reception-side LSI via the B-side signal line 302.

When the transmission error occurs on the B-side signal line, the transmission-side LSI transmits bit data [9:0] with CRC for transmission whose data width is changed by the data processing unit 101 (see FIG. 3) to the reception-side LSI via the A-side signal line 302.

Figure 6:
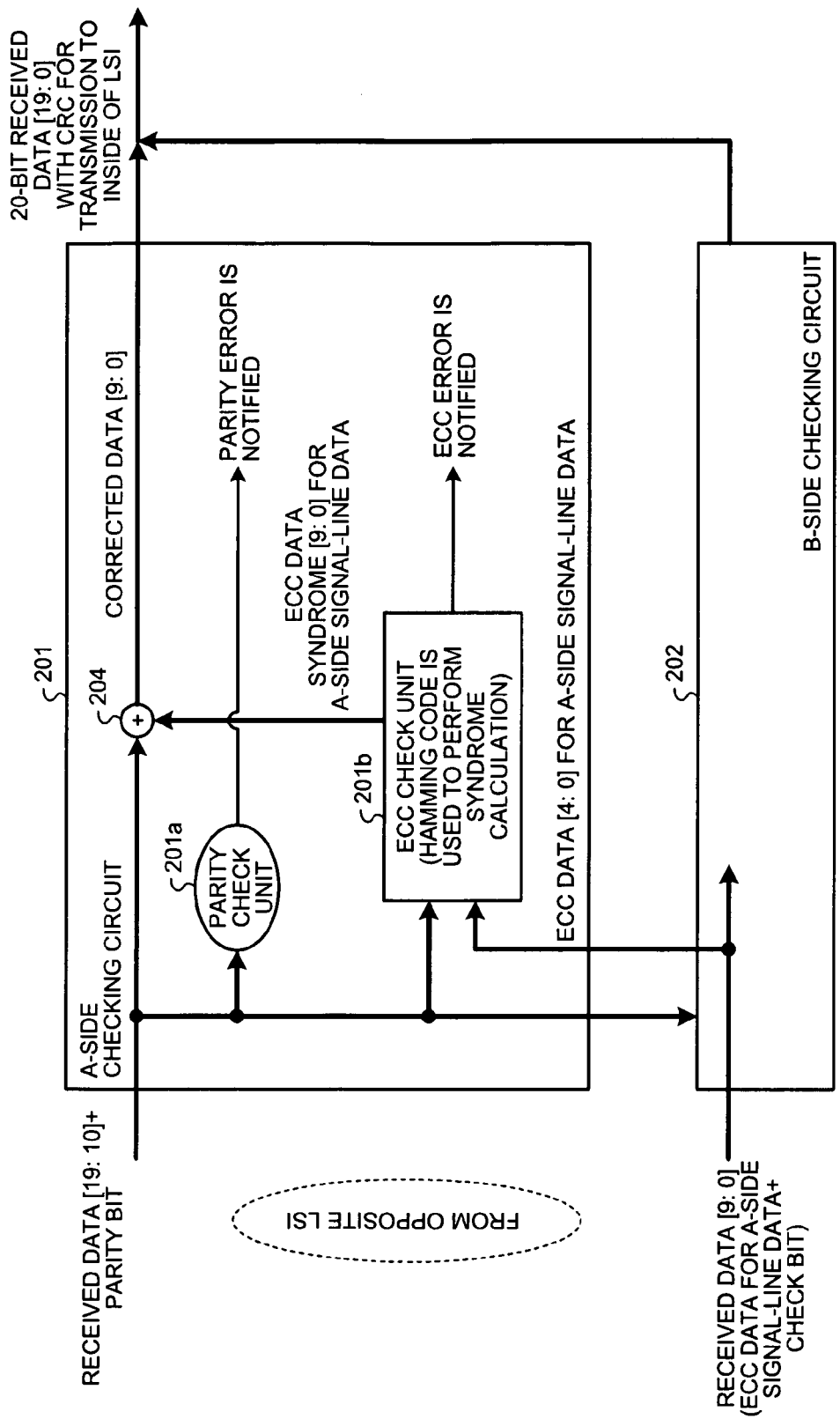
FIG. 6 is a diagram for explaining a detailed configuration of a reception-side LSI and an overview of a data check method of the information processing apparatus according to the one example of the embodiment.

Next, a detailed configuration of the reception-side LSI and an overview of a data check method of the information processing apparatus according to the one example of the embodiment will be explained below. FIG. 6 is a diagram for explaining the detailed configuration of the reception-side LSI and the overview of the data check method of the information processing apparatus according to the one example of the embodiment.

As illustrated in this figure, when the B-side signal line 302 is made unusable, the parity check unit 201a of an A-side checking circuit 201 performs 1-bit parity check on the A-side signal-line data [19:10] (high-order 10 bits), to perform error detection.

The ECC check unit 201b receives the A-side signal-line data [19:10] and ECC [4:0] of corresponding received data [9:0] from a B-side checking circuit 201 and calculates ECC data syndrome [9:0] using the Hamming code, and an adder 204 performs error correction on the A-side signal-line data [19:10].

When the A-side signal line 301 is made unusable, the target data is changed to the B-side signal-line data [9:0], and the corresponding ECC data [4:0] is the same as the case where the B-side signal line 302 is made unusable, except that it is high-order 5 bits of the received data [19:10] and is ECC data syndrome [19:10].

Figure 7:
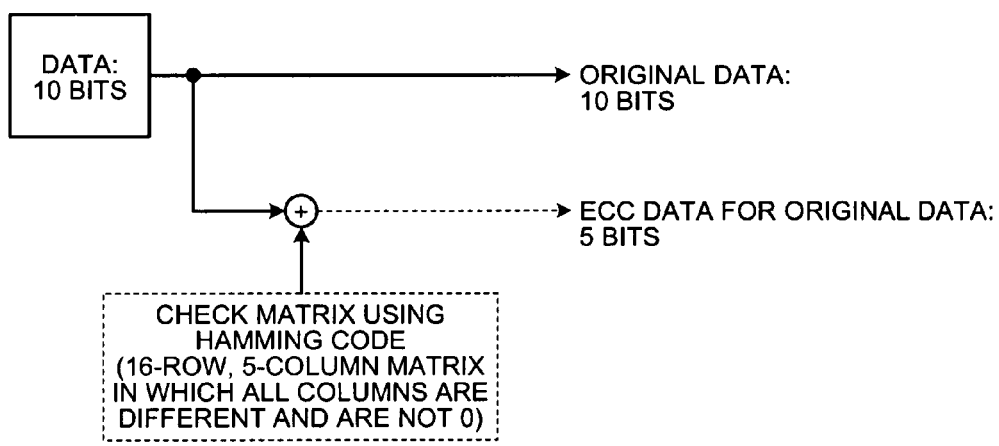
FIG. 7 is a diagram representing a parity-check generation method in the transmission-side LSI of the information processing apparatus according to the one example of the embodiment.

Next, a parity-check generation method in the transmission-side LSI of the information processing apparatus according to the one example of the embodiment will be explained below. FIG. 7 is a diagram representing the parity-check generation method in the transmission-side LSI of the information processing apparatus according to the one example of the embodiment.

It is assumed that the transmission data consists of 10 bits and this transmission data is a column vector. In a computation between a 16-column×5-row check matrix, obtained by using the Hamming code, in which data in all the columns is different from each other and a column with only 0 does not exist and the column vector, an exclusive logical sum of the products of each column element of the check matrix and each column element of the column vector is calculated. With the computation, encoded 5-bit ECC data can be obtained from the original 10-bit data.

Figure 8:
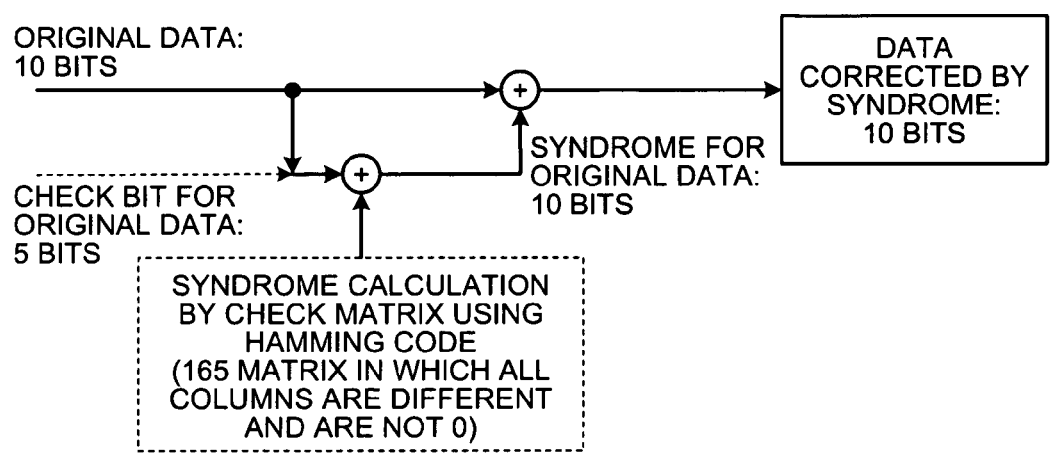
FIG. 8 is a diagram representing an error correction method using ECC data in the reception-side LSI of the information processing apparatus according to the one example of the embodiment.

Next, an error correction method using ECC data in the reception-side LSI of the information processing apparatus according to the one example of the embodiment will be explained below. FIG. 8 is a diagram representing the error correction method using ECC data in the reception-side LSI of the information processing apparatus according to the one example of the embodiment.

The same check matrix as that in the transmission side is used to decode 10-bit received data and a check bit thereof and perform syndrome calculation. A 10-bit syndrome is such that the position where an error occurs is 1 and any other positions are 0. Therefore, by calculating an exclusive logical sum of the 10-bit syndrome and the received data, the error correction can be performed.

Figure 9:
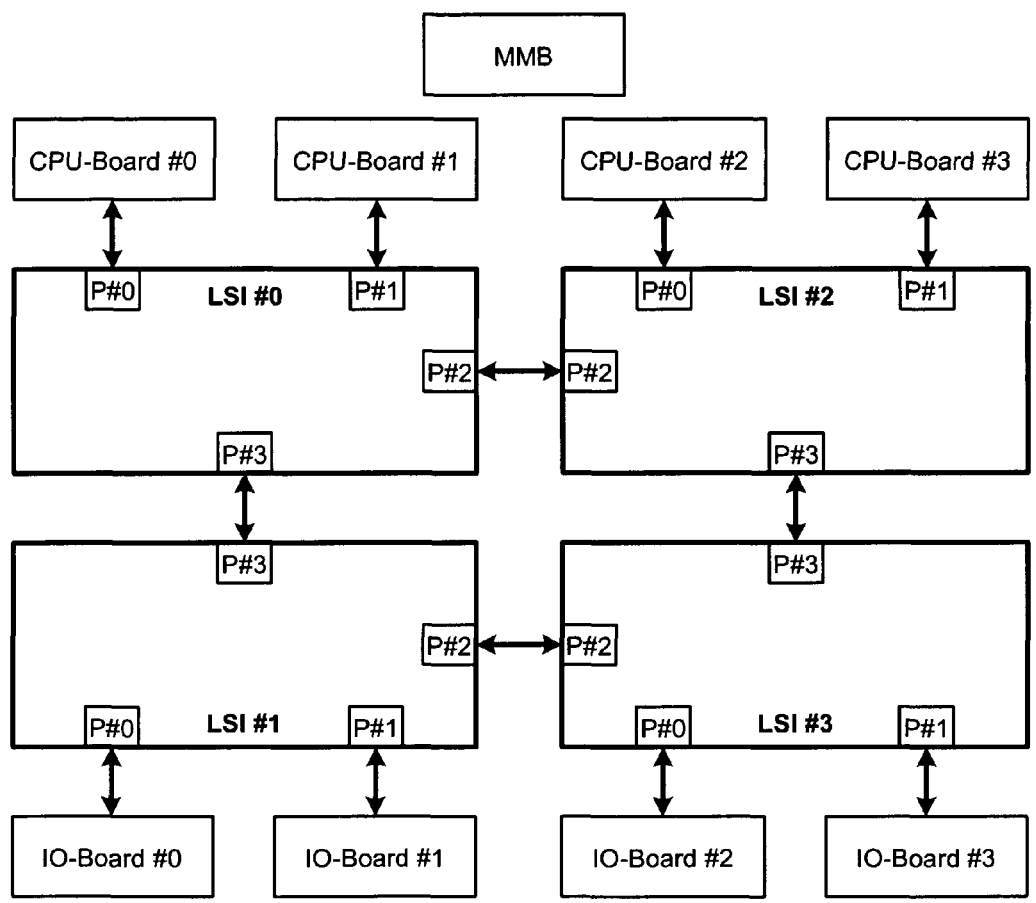
FIG. 9 is a block diagram representing an entire configuration of a parallel computer when the information processing apparatus according to the one example of the embodiment is the parallel computer.

Next, an entire configuration of a parallel computer when the information processing apparatus according to the one example of the embodiment is the parallel computer will be explained below. FIG. 9 is a block diagram representing the entire configuration of the parallel computer when the information processing apparatus according to the one example of the embodiment is the parallel computer.

As an application example of the one example of the embodiment, a parallel computer will be exemplified. Each CPU is provided on each CPU-board of the parallel computer. Any device other than the present parallel computer connected thereto using a PCI card or an Ethernet (registered trademark) card ("P#i (i=0, 1, 3)" in FIG. 9) which is connected to the parallel computer is connected thereto through an IO-board.

The CPU-board and the IO-board mutually exchange instructions. The instructions and data are exchanged via crossbars (LSI #j (j=1 to 3 in FIG. 9). A large-scale computer system is generally configured with a plurality of platforms (system board) including a plurality of CPUs, and the CPUs and IOs can be freely combined through the crossbars.

Thus, in the communication between the LSIs in the parallel computer, it is possible to effectively use the transmission channel degenerated caused by the transmission error as a transmission channel for transmission of ECC data, enhance error resistance, prevent a decrease in the data transmission rate because of further occurrence of the transmission error and degeneration of the transmission channel, and to prevent a decrease in the throughput of the entire parallel computer.

The one example of the embodiment of the present invention has been explained as above, however, the present invention is not limited thereto. Therefore, the present invention may be implemented in further various different embodiments within the scope of the technical idea described in claims. In addition, the functions and effects described in the one example of the embodiment are not also limited thereto.

The one example of the embodiment exemplifies the case where the degeneration control of the transmission channel is performed segment by segment obtained by equally dividing all the signal lines into high-order ones and low-order signal ones, however, the example is not limited thereto. Therefore, a combination in which a plurality of signal lines is appropriately combined may be set as a segment being a unit for the degeneration control.

Of the processes explained in the one example of the embodiment, all or part of the processes explained as being performed automatically can be performed manually, or all or part of the processes explained as being performed manually can be performed automatically by a known method. In addition, the processing procedures, the control procedures, specific names, and information including various data and parameters described in the one example of the embodiment can be changed as required unless otherwise specified.

The constituent elements of the information processing apparatus, the data transmitting device, and the data receiving device illustrated in the figures are functionally conceptual, and need not always be configured physically as illustrated in the figures. That is, the specific forms of separating or integrating the constituent elements of the devices are not limited to the illustrated ones, and all or part thereof can be separated or integrated either functionally or physically on an arbitrary basis according to various types of loads or use conditions.

According to a disclosed information processing apparatus, data transmitting device, and data transfer method of the data transmitting device, the transmission channel degenerated caused by detection of an error based on the data with parity is used to transmit the ECC data for the transmission data to the data receiving device. Therefore, it is possible to perform detection and correction of ECC error using the ECC data together with parity check based on parity check data initially added to the transmission data, and thus, there is an effect that a usable signal line although it has been degenerated can be effectively used without making it inactive.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus comprising:
    a data transmitting device that transmits data with N-bit width (N: positive integer);
    a data receiving device that receives the data with N-bit width; and
    a system monitoring device connected to the data transmitting device and the data receiving device, wherein
    the data transmitting device includes
        a first data-with-parity generating circuit that generates first data with parity in which a parity is added to first data with X-bit width (X: positive integer satisfying N>X) of the data with N-bit width;
        a second data-with-parity generating circuit that generates second data with parity in which a parity is added to second data with (N−X)-bit width of the data with N-bit width;
        a first ECC generating circuit that generates first ECC data for the first data;
        a second ECC generating circuit that generates second ECC data for the second data;
        a selection-signal generating circuit that generates and outputs a first selection signal and a second selection signal based on a first or a second error notification signal for the first or the second data with parity received from the data receiving device;
        a first selecting circuit that selects and outputs either one of the first data with parity and the second ECC data based on the first selection signal;
        a second selecting circuit that selects and outputs either one of the first ECC data and the second data with parity based on the second selection signal; and
        a data processing unit that degenerates the data with N-bit width to either the first data or the data with (N−X)-bit width based on a data-width degeneration notification signal received from the system monitoring device, and outputs degenerated data, and
    the data receiving device includes
        a first parity checking circuit that detects a parity error for the first data with parity and outputs the first error notification signal when an error occurs;
        a second parity checking circuit that detects a parity error for the second data with parity and outputs the second error notification signal when an error occurs;
        a first ECC correcting circuit that detects and corrects an ECC error for the first ECC data; and
        a second ECC correcting circuit that detects and corrects an ECC error for the second ECC data.

2. The information processing apparatus according to claim 1, wherein the system monitoring device further outputs the data-width degeneration notification signal to the data processing unit based on the first or the second error notification signal.

3. The information processing apparatus according to claim 1, wherein the X is N/2.

4. A data transmitting device for transmitting data with N-bit width to a data receiving device connected to a system monitoring device and that is connected to the system monitoring device, the data transmitting device comprising:
    a first data-with-parity generating circuit that generates first data with parity in which a parity is added to first data with X-bit width (X: positive integer satisfying N>X) of the data with N-bit width;
    a second data-with-parity generating circuit that generates second data with parity in which a parity is added to second data with (N−X)-bit width of the data with N-bit width;
    a first ECC generating circuit that generates first ECC data for the first data;
    a second ECC generating circuit that generates second ECC data for the second data;
    a selection-signal generating circuit that generates and outputs a first selection signal and a second selection signal based on a first or a second error notification signal for the first or the second data with parity received from the data receiving device;
    a first selecting circuit that selects and outputs either one of the first data with parity and the second ECC data based on the first selection signal;
    a second selecting circuit that selects and outputs either one of the first ECC data and the second data with parity based on the second selection signal; and
    a data processing unit that degenerates the data with N-bit width to either the first data or the data with (N−X)-bit width based on a data-width degeneration notification signal received from the system monitoring device, and outputs degenerated data.

5. The information processing apparatus according to claim 4, wherein the X is N/2.

6. A data transfer method for a data transmitting device that transmits data with N-bit width to a data receiving device connected to a system monitoring device and that is connected to the system monitoring device, the data transfer method comprising:
    generating, by a first data-with-parity generating circuit, first data with parity in which a parity is added to first data with X-bit width (X: positive integer satisfying N>X) of the data with N-bit width;
    generating, by a second data-with-parity generating circuit, second data with parity in which a parity is added to second data with (N−X)-bit width of the data with N-bit width;
    selecting and outputting the first data with parity by a first selecting circuit;
    selecting and outputting the second data with parity by a second selecting circuit;
    generating and outputting, by a selection-signal generating circuit, a first selection signal and a second selection signal based on a first or a second error notification signal for the first or the second data with parity received from the data receiving device;
    regenerating the first data with parity by a first data-with-parity generating circuit;

regenerating the second data with parity by a second data-with-parity generating circuit;

generating first ECC data for the first data by a first ECC generating circuit;

generating second ECC data for the second data by a second ECC generating circuit;

degenerating, by a data processing unit, the data with N-bit width to either the first data or the data with (N−X)-bit width based on a data-width degeneration notification signal received from the system monitoring device, and outputting degenerated data;

generating and outputting, by a selection-signal generating circuit, a first selection signal and a second selection signal based on a first or a second error notification signal for the first or the second data with parity received from the data receiving device;

selecting and outputting, by a first selecting circuit, either one of the first data with parity and the second ECC data based on the first selection signal; and selecting and outputting, by a second selecting circuit, either one of the first ECC data and the second data with parity based on the second selection signal.

7. The data transfer method according to claim 6, further comprising outputting, by the system monitoring device, the data-width degeneration notification signal to the data processing unit based on the first or the second error notification signal.

8. The data transfer method according to claim 6, wherein the X is N/2.

* * * * *